US012771943B2

(12) United States Patent
Amano

(10) Patent No.: US 12,771,943 B2
(45) Date of Patent: Oct. 20, 2026

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Yuto Amano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 55 days.

(21) Appl. No.: 18/978,328

(22) Filed: Dec. 12, 2024

(65) Prior Publication Data

US 2025/0211859 A1 Jun. 26, 2025

(30) Foreign Application Priority Data

Dec. 21, 2023 (JP) ................................ 2023-216195

(51) Int. Cl.
*H04N 23/695* (2023.01)
*H04N 23/69* (2023.01)

(52) U.S. Cl.
CPC ........... *H04N 23/695* (2023.01); *H04N 23/69* (2023.01)

(58) Field of Classification Search
CPC ............................ H04N 23/695; H04N 23/69
USPC ...................................................... 348/222.1
See application file for complete search history.

(56) References Cited

U.S. PATENT DOCUMENTS

2021/0368094 A1* 11/2021 Li ....................... G06V 10/255

FOREIGN PATENT DOCUMENTS

JP 2011040896 A 2/2011
JP 2012095194 A 5/2012

* cited by examiner

*Primary Examiner* — Joel W Fosselman
(74) *Attorney, Agent, or Firm* — Cowan, Liebowitz & Latman, P.C.

(57) ABSTRACT

There is provided with an information processing apparatus. A first obtaining unit obtains information designating an image capturing range on a captured image captured by an image capturing unit rotatable about an optical axis. A determining unit determines whether or not to rotate the image capturing unit about the optical axis based on the information that is obtained. A controlling unit controls the image capturing unit based on a determination result of the determining unit.

10 Claims, 8 Drawing Sheets

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus, an information processing method, and a storage medium.

Description of the Related Art

Image capturing apparatuses that include a pan, tilt, rotation mechanism, and the like and can display a captured image on an operation terminal such as a PC in real time have been widely used. Such image capturing apparatuses include one including a camera head unit that can rotate an optical axis center as an orientation of an image capturing sensor, and an angle of view can be changed in accordance with user's preference. There is an image capturing apparatus that can change an orientation of a display image in accordance with the orientation of the image capturing sensor.

For example, Japanese Patent Laid-Open No. 2012-95194 discloses an image capturing apparatus that can change an orientation of an image capturing sensor and an orientation of a display image by a user performing a predetermined operation on a display image of an operation terminal.

SUMMARY OF THE INVENTION

According to one embodiment of the present invention, an information processing apparatus comprises: a first obtaining unit configured to obtain information designating an image capturing range on a captured image captured by an image capturing unit rotatable about an optical axis; a determining unit configured to determine whether or not to rotate the image capturing unit about the optical axis based on the information that is obtained; and a controlling unit configured to control the image capturing unit based on a determination result determined by the determining unit.

According to one embodiment of the present invention, an information processing method comprises: obtaining information designating an image capturing range on a captured image captured by an image capturing unit rotatable about an optical axis; determining whether or not to rotate the image capturing unit about the optical axis based on the information that is obtained; and controlling the image capturing unit based on a determination result determined by the determining unit.

According to one embodiment of the present invention, a non-transitory computer-readable storage medium stores program which, when executed by a computer comprising a processor and memory, causes the computer to: obtain information designating an image capturing range on a captured image captured by an image capturing unit rotatable about an optical axis; determine whether or not to rotate the image capturing unit about the optical axis based on the information that is obtained; and control the image capturing unit based on a determination result determined by the determining unit.

Further features of the present invention will become apparent from the following description of exemplary embodiments (with reference to the attached drawings).

DESCRIPTION OF THE EMBODIMENTS

Figure 1:
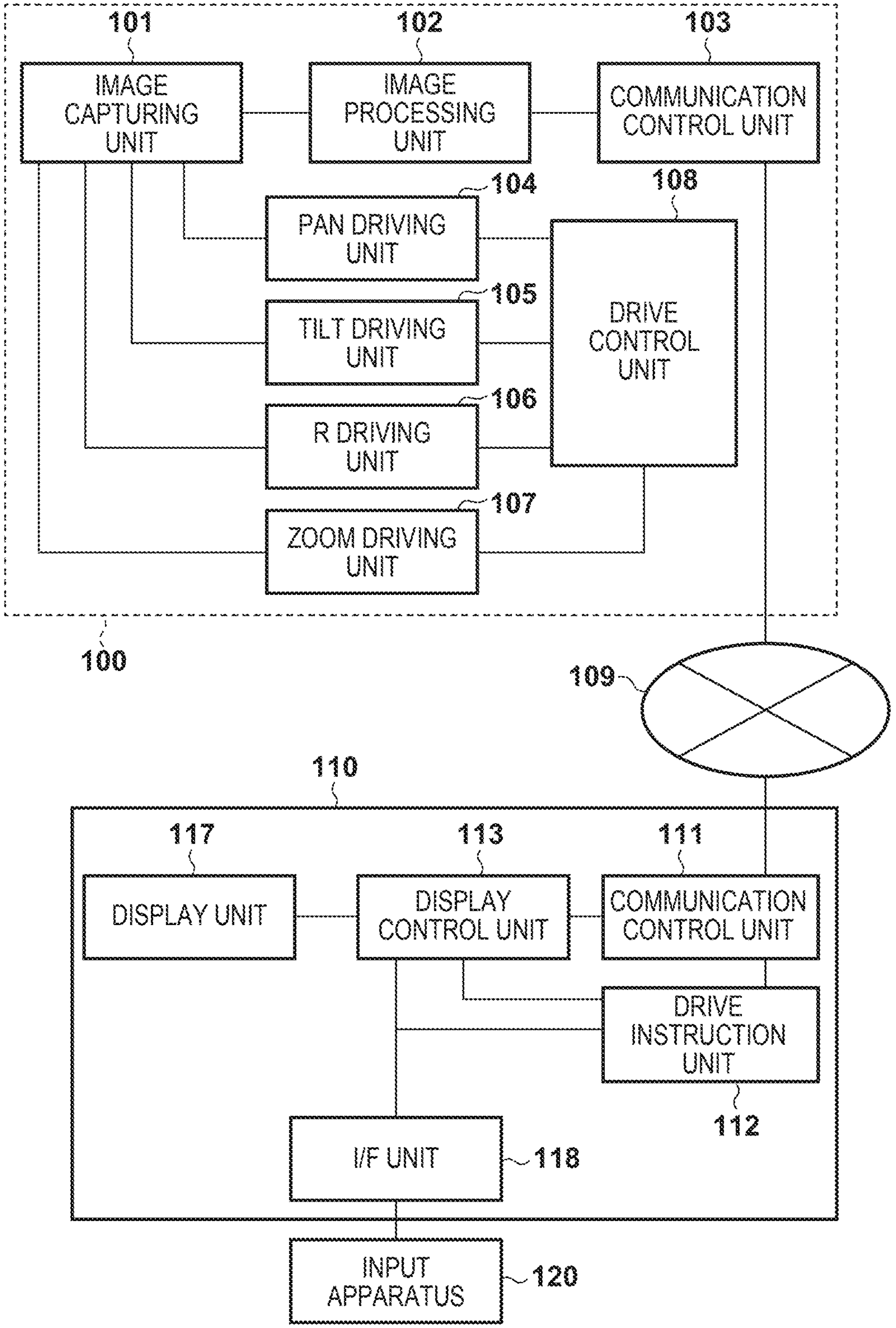
FIG. 1 is a block diagram illustrating an example of a configuration of a system including an information processing apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In the technology disclosed in Japanese Patent Laid-Open No. 2012-95194, there are many setting items by the user, and there is much effort necessary for changing an orientation of an image capturing sensor and an orientation of a display image.

Embodiments of the present invention provide an information processing apparatus that easily sets an image capturing parameter for capturing an image capturing range designated by a user in the apparatus that can change an orientation of an image capturing sensor.

First Embodiment

FIG. 1 illustrates an example of the configuration of an image capturing system including an information processing apparatus according to the present embodiment. In the image capturing system according to the present embodiment, an information processing apparatus 100 (image capturing apparatus) and an operation terminal 110 for operating the information processing apparatus 100 are connected via a network 109. The information processing apparatus 100 distributes a captured image captured by the information processing apparatus 100 to the operation terminal 110. The operation terminal 110 gives the information processing apparatus 100 an image capturing instruction regarding an image capturing direction or an angle of view of the information processing apparatus 100. The operation terminal 110 receives a captured image from the information processing apparatus 100 and causes a display unit 117 described later to display the received captured image.

The configuration of the information processing apparatus 100 (image capturing apparatus) in the example of FIG. 1 will be described. Explanations will be given on an assumption that the information processing apparatus 100 according to the present embodiment includes an image capturing unit 101 and can obtain a captured image. However, the information processing apparatus 100 does not need to have an image capturing function, and may obtain, from an external image capturing apparatus (not illustrated), a captured image to be a processing target.

The configuration of the information processing apparatus 100 according to the present embodiment will be described below. The information processing apparatus 100 includes the image capturing unit 101, an image processing unit 102, a communication control unit 103, a pan driving unit 104, a tilt driving unit 105, a rotation driving unit (R driving unit) 106, a zoom driving unit 107, and a drive control unit 108. The information processing apparatus 100 is connected to the operation terminal 110 via the network 109 so as to be able to transmit and receive information.

The image capturing unit 101 includes an image capturing sensor and captures a subject. Image data captured by the image capturing unit 101 is sent to the image processing unit 102 described later. The image processing unit 102 performs processing of a video signal captured by the image capturing unit 101.

The image processing performed in the image processing unit 102 includes known general image processing performed on captured image data. For example, the image processing unit 102 can convert an image signal captured by the image capturing unit 101 into a digital video signal, encode a digital video signal, and the like. For example, YUV or the like may be used as a format of the digital video signal. As a method of encoding the digital video signal, for example, a method based on a standard such as MPEG4, H.265, H.264, MJPEG, or JPEG may be used. The video signal subjected to image processing by the image processing unit 102 is output from the network 109 to the operation terminal 110 described later via the communication control unit 103.

The image processing unit 102 obtains information designating an image capturing range on a captured image. The image processing unit 102 according to the present embodiment can obtain information regarding two points designated by the user on the captured image as the information designating the image capturing range. More specifically, the image processing unit 102 can obtain definition information that is information for defining a straight line having both ends as two points designated by the user on the captured image. Hereinafter, when simply expressed as "straight line", it refers to a line segment defined by such definition information. In the following description, such definition information is used as information designating an image capturing range, but different information may be used as long as the information similarly designates the image capturing range. Here, the image processing unit 102 can obtain definition information based on a user operation input via the operation terminal 110. For example, the image processing unit 102 may detect a straight line input by the user (e.g., by a drag operation using a mouse or the like) in a display image displayed on the display unit 117 described later of the operation terminal 110 and obtain the straight line as definition information. In the present embodiment, for example, in a case where two points are designated on a display image, a line segment connecting the two points may be a straight line, or a line input by the user may be a straight line. The following description assumes that the start point and the end point of the straight line are obtained as two points based on the straight line input by the user in this manner, but may assume an aspect in which two points are directly input, and the present invention is not particularly limited to this as long as two designated points are obtained.

For example, it is also conceivable that the line input by the user is distorted and is not straight line. From such a viewpoint, the image processing unit 102 may generate a straight line by obtaining a plurality of coordinates on a line drawn on the display image and performing linear approximation based on the plurality of coordinates. There may be a plurality of methods of generating a straight line, and the user may be allowed to select one of them. Both of the "two points on display" may be positioned on the captured image or may be positioned outside the captured image of the display including the captured image.

The image processing unit 102 controls rotation of the image capturing unit that captures the captured image based on the information (here, information indicating two points) that is obtained and designates the image capturing range on the captured image. In the present embodiment, the image processing unit 102 sets a rectangular area on the captured image based on two points, and determines an image capturing range of the image capturing unit 101 by controlling an image capturing parameter based on the rectangular area (e.g., determines an image capturing range so as to capture the rectangular area). In the present embodiment, control of the image capturing range is performed by controlling pan, tilt, zoom, and rotation drive so as to capture a predetermined image capturing range. Control of an image capturing orientation of the image capturing apparatus performed to capture a designated area in a captured image can be performed by a known general image capturing technique, and the description thereof is omitted here.

The pan driving unit 104, the tilt driving unit 105, and the R driving unit 106 perform pan drive, tilt drive, and rotation drive, respectively, of the image capturing unit 101. The zoom driving unit 107 changes the zoom magnification of the image capturing unit 101. The rotation drive according to the present embodiment is to rotate an image capturing element of the image capturing unit 101 about the optical axis. The drive control unit 108 controls the image capturing orientation and the angle of view of the image capturing unit 101 by controlling the pan driving unit 104, the tilt driving unit 105, the R driving unit 106, and the zoom driving unit 107. The control of the image capturing orientation according to the present embodiment includes control of pan drive, tilt drive, and rotation drive of the image capturing unit 101.

The image processing unit 102 controls the rotation of the image capturing unit 101 as described above. The image processing unit 102 may control rotation of the image capturing unit based on the positional relationship between the start point and the end point of a straight line included in the definition information, for example. For example, the image processing unit 102 may determine whether or not to rotate the image capturing unit by a predetermined angle (here, 180°) based on an up-down relationship (magnitude relationship) between the y coordinate of the start point and the y coordinate of the end point of the straight line in the coordinate system having the upper left end of the captured image as the origin. In this case, in the coordinate system having the upper left end of the captured image as the origin, for example, the image processing unit 102 may rotate the image capturing unit by 180° in a case where the y coordinate of the start point of the straight line is equal to or greater than the y coordinate of the end point, without rotating the image capturing unit in a case where the y coordinate of the start point of the straight line is less than the y coordinate of the end point. Note that this example assumes that only the y coordinate is compared to determine whether or not to perform the 180° rotation of the image capturing unit, but the 180° rotation of the image capturing unit may be performed only in a case where both the x coordinate and the y coordinate of the start point are equal to or greater than those of the end point, with reference also to the x coordinate, for example. Such a condition and a rotation angle are examples, and they may be arbitrarily set in accordance with a condition desired by the user. In the following description, the coordinate in the captured image or display is a coordinate in a two-dimensional coordinate system in which the upper left end of the captured image is the origin, a vertical downward direction of the image is a positive y axis, and a horizontal right direction of the image is a positive x axis.

The communication control unit 103 controls transmission and reception of data to and from the outside of the information processing apparatus 100. For example, the communication control unit 103 can perform packetization processing on an encoded digital video signal. Furthermore, in order to output, to the network 109, a digital video signal to be transmitted to the outside in accordance with a predetermined format, the communication control unit 103 can also perform packet multiplexing processing by arranging the signal in accordance with a predetermined format. As the predetermined format here, for example, a format such as hypertext transfer protocol (HTTP) or real-time transport protocol (RTP) can be used. The communication control unit 103 transmits, to the network 109, the digital video signal captured by the image capturing unit 101. The communication control unit 103 receives and outputs, to the drive control unit 108, an instruction from the operation terminal 110 described later.

Next, the configuration of the operation terminal 110 will be described. The operation terminal 110 is a terminal that obtains an operation by the user. The operation terminal 110 may be, for example, a personal computer (PC) or the like, or may be a mobile terminal such as a smartphone, and is not particularly limited as long as the user's operation can be obtained.

The communication control unit 111 receives and transmits, to the display control unit 113 described later, the digital video signal output from the communication control unit 103. The communication control unit 111 transmits an instruction of a drive instruction unit 112 described later to the information processing apparatus 100 via the network 109.

The drive instruction unit 112 gives an instruction of control content at the time of controlling the orientation of the image capturing unit 101. The drive instruction unit 112 can instruct a rotation type, a rotation direction, or a rotation angle for rotating the image capturing unit 101, for example. Here, the instruction of the rotation type refers to an instruction as to which of pan rotation drive, tilt rotation drive, rotation drive, and zoom drive the instruction from the operation terminal 110 is to instruct. The instruction of the rotation direction refers to an instruction as to which direction to rotate for each rotation type. The instruction of the rotation angle refers to an instruction as to how many degrees to rotate for each rotation type.

The display control unit 113 performs control of causing the display unit 117 to display the captured image transmitted from the information processing apparatus 100. The display control unit 113 receives the definition information obtained by an interface unit 118 described later, and performs rotation display of the captured image based on the definition information.

The interface unit 118 obtains and outputs, to the display control unit 113 and the drive instruction unit 112, the definition information input by an input apparatus 120 described later.

The input apparatus 120 includes a pointing device such as a mouse or a digitizer, a keyboard, or a joystick, and receives a user's input. For example, the input apparatus 120 may be used to receive an input such as the rotation type, the rotation direction, or the rotation angle to the drive instruction unit 112. The input apparatus 120 may be used by the user to input the definition information.

For example, the input apparatus 120 is a pointing device or the like, and can obtain a line segment between two points as the definition information based on a user input instructing the two points in the image displayed on the display unit 117. For example, the input apparatus 120 is a mouse or the like, and can obtain the definition information based on a user input of drawing a line directly in the image displayed on the display unit 117.

Details will be described later, but in the present embodiment, there is a case where the image capturing parameter is controlled such that a rectangular area having a straight line defined by the definition information as a diagonal becomes an image capturing range. From such a viewpoint, the straight line of the user input for designating the definition information may be defined to be a diagonal of the rectangular area (the vertical side and the horizontal side are each parallel to the captured image) maintaining the aspect ratio of the image capturing range by the image capturing sensor with the start point as the vertex of the upper left end of the rectangular area. Note that here, the vertical side of the rectangle refers to a side having a smaller angle formed with the y axis in the coordinate system with the upper left end of the captured image as the origin.

For example, the definition information may be a straight line input by the user as it is, or may be the definition information by correcting the input straight line. For example, a diagonal having a vertex as both ends of a rectangular area in which the position of the vertex at the lower right end is closest to the end point of the straight line input by the user, of the rectangular area in which the aspect ratio of the image capturing range by the image capturing sensor is maintained, with the start point of the straight line input by the user as the vertex at the upper left end of the rectangular area, may be defined as the definition information. The operation of the information processing apparatus 100 in a case where the input position or the range is not limited will be described later with reference to FIG. 8.

Figure 2:
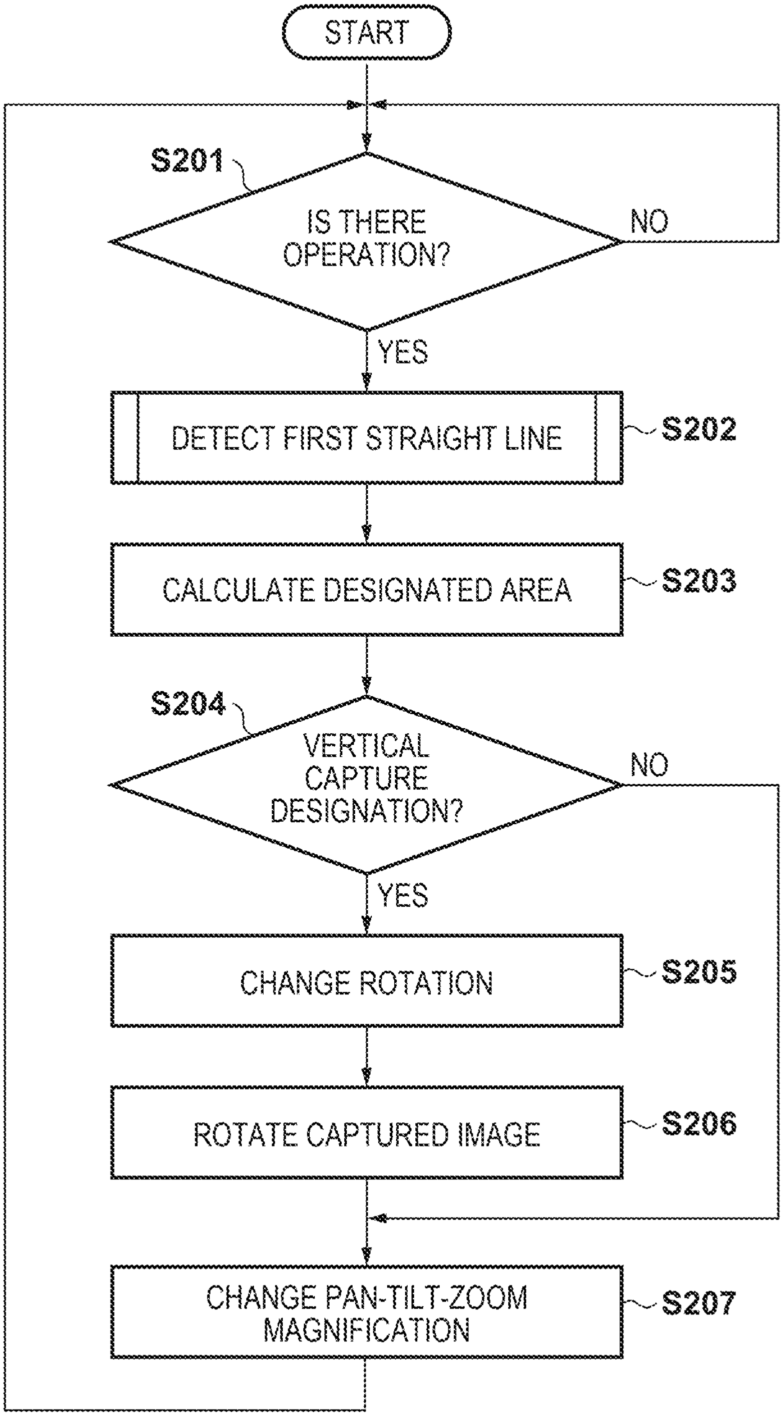
FIG. 2 is a flowchart showing an example of processing of controlling an image capturing parameter and rotation.

Hereinafter, the operation of the image capturing system according to the present embodiment will be described with reference to FIG. 2. FIG. 2 is a flowchart showing an example of the control processing by the information processing apparatus 100 according to the present embodiment. In a form in which the information processing apparatus 100 incorporates a processor and a memory, the processing flow shown in FIG. 2 is executed by a program for causing the processor to execute the procedure illustrated in FIG. 2. The processor incorporated in the information processing apparatus 100 according to the present embodiment is a computer, and executes a program read from a memory incorporated in the information processing apparatus 100. The memory incorporated in the information processing apparatus 100 is a recording medium storing this program so that the program can be read by this processor.

In S201, the information processing apparatus 100 determines whether or not an instruction for setting the angle of view (change of the image capturing range) has been obtained from the operation terminal 110. If there is no instruction for setting the angle of view (change of the image capturing range) (NO in S201), the process repeats S201, and otherwise, the process proceeds to S202.

In S202, the image processing unit 102 obtains information designating the image capturing range on the captured image. Here, the information processing apparatus 100 performs a first straight line detection operation, which is an operation of obtaining definition information, based on the coordinate information designated by the user input in the operation terminal 110.

Figure 3A:
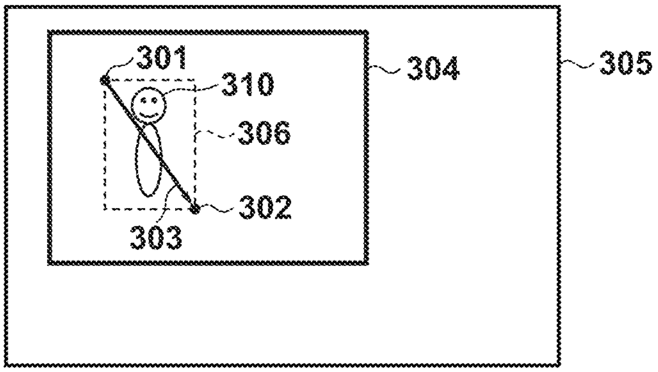
FIGS. 3A, 3B, 3C, 3D, and 3E are views for explaining a straight line indicating two points on a captured image.

Hereinafter, the first straight line detection operation will be described with reference to FIGS. 3A to 3E. FIG. 3A illustrates an example of a display image displayed on the display of a screen 305 of the operation terminal 110. A display image 304 is a captured image captured by image capturing unit 101 and displayed on the screen 305. The information processing apparatus 100 obtains coordinate values of a start point 301 and an end point 302 on the captured image designated by the user in the operation terminal 110. The information processing apparatus 100 generates a first straight line 303 by connecting the designated two points with a straight line. The information processing apparatus 100 sets a designated area 306, which is a rectangular area having the first straight line 303 as a diagonal and having the vertical side and the horizontal side parallel to the display image 304. In FIGS. 3A to 3E, a subject 310 is a person, but a different subject such as another animal, a door, or a passage may be captured. Hereinafter, when simply expressed as "display", it refers to display including a captured image such as 305 in FIG. 3A. In FIGS. 3A to 3E and FIG. 4 described later, the same reference numerals are given to common configurations, and redundant description is omitted.

Figure 3B:
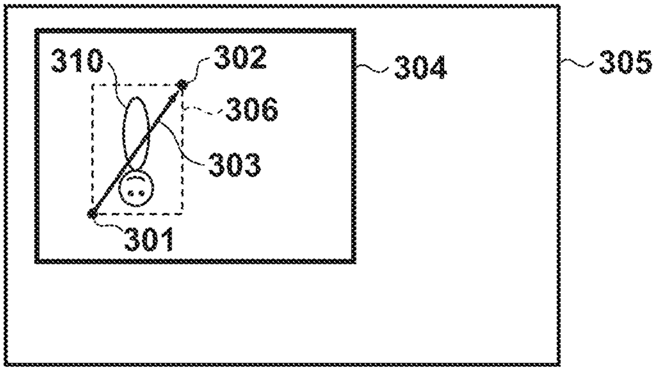

Note that in the example of FIG. 3A, the y coordinate of the start point 301 is less than the y coordinate of the end point 302, and the image capturing unit is not rotated. On the other hand, for example, in FIG. 3B, a straight line is input on the captured image similarly to the example of FIG. 3A, but the y coordinate of the start point 301 is greater than the y coordinate of the end point 302. In such a case, the image processing unit 102 can rotate the image capturing unit as described above. According to such processing, for example, as illustrated in FIG. 3B (e.g., due to the image capturing unit 101 installed upside down), in a case where the subject is projected upside down, it is possible to perform rotation display of the captured image based on the input of the user who has confirmed it. In particular, by determining whether or not to perform this rotation based on the same input as the input of the two points for setting the image capturing parameter, it is possible to control the rotation display including the vertical inversion of display by an operation simpler than before without requiring an additional operation.

In S203, the image processing unit 102 calculates the designated area 306, which is a rectangular area, based on two points (here, the first straight line 303 that is detected) on the captured image. In S204, the image processing unit 102 makes a vertical capture determination based on the designated area 306. The vertical capture determination is a determination as to whether or not the length of the vertical side (side in the vertical direction) of the designated area 306 is longer than the length of the horizontal side (side in the horizontal direction). In a case where the length of the vertical side of the designated area is greater than the length of the horizontal side, the process transitions to S205, and otherwise, the process transitions to S207.

In the case where the length of the vertical side of the designated area is greater than the length of the horizontal side, the image processing unit 102 according to the present embodiment can control the image capturing parameter so as to rotate the image capturing sensor by 90° by rotation drive. According to such processing, for example, in a case where a vertically-long designated area (the vertical side is longer than the horizontal side) is designated, it is judged that the user has designated a vertically-long subject as a subject desired to include in the image capturing range, and the rotation drive can be performed such that the image capturing sensor has an appropriate orientation with respect to such a subject.

Figure 3C:
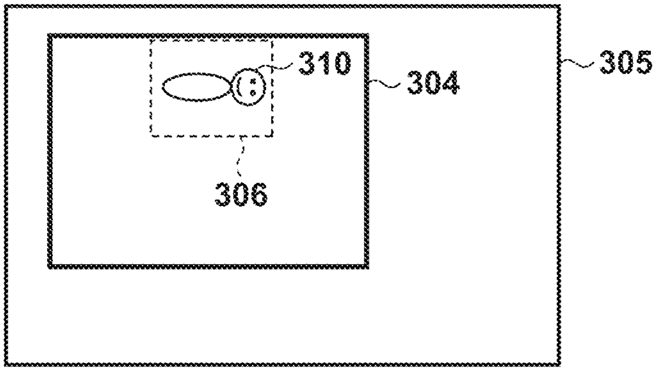

In S205, the information processing apparatus 100 controls the image capturing unit 101 so as to rotate the image capturing orientation of the image capturing unit 101 by 90° clockwise about the optical axis by the rotation drive. FIG. 3C illustrates an example of the screen 305 of the operation terminal 110 after the rotation drive of the image capturing unit 101 from the state of FIG. 3A. In the state of FIG. 3C, the image capturing sensor of the image capturing unit 101 rotates by 90° counterclockwise about the optical axis before the rotation drive, and as a result, the subject 310 rotates by 90° clockwise.

Figure 3D:
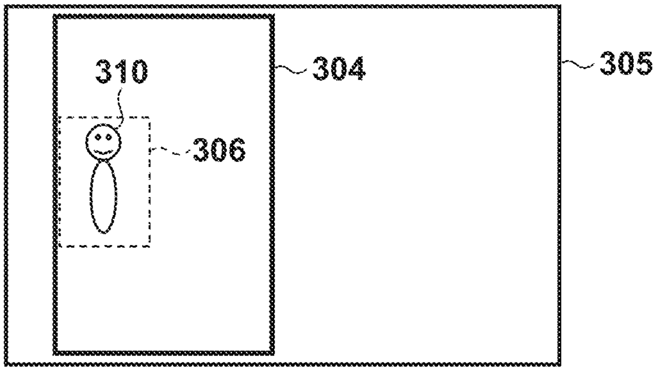

In S206, the information processing apparatus 100 controls rotation so as to rotate the captured image by 90° counterclockwise. The control of this rotation is a control of the orientation of display of the captured image different from the rotation drive. In other words, the control of this rotation is a control of the orientation of display of the captured image for the subject 310 to be brought into an upright state when displayed with the operation terminal 110. FIG. 3D illustrates an example of a case of rotating the display image 304 illustrated in FIG. 3C. The display image 304 in FIG. 3D is an image of the display image 304 in FIG. 3C rotated by 90° counterclockwise. Note that S206 may come after S207. S206 may be performed on the operation terminal 110 without performing on the information processing apparatus 100 side.

Figure 3E:
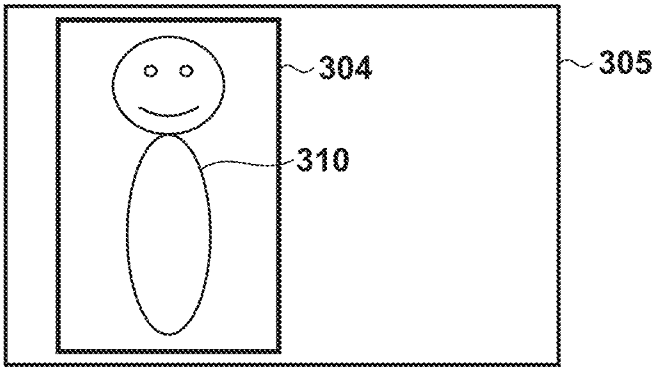

In S207, the image processing unit 102 controls the image capturing parameter of the image capturing unit 101 based on the information indicating the two points on the display obtained in S202. Here, the image processing unit 102 can control the image capturing parameter such that pan, tilt, and zoom drive are performed such that the designated area 306 illustrated in FIG. 3D becomes an image capturing range. FIG. 3E illustrates an example of the screen 305 of the captured image displayed on the operation terminal 110 in a case of performing control of the image capturing parameter and control of rotation of the captured image. In the example of FIG. 3E, the zoom magnification is changed to match the subject 310, the pan direction (horizontal direction) in the image capturing direction is changed, and the image capturing parameter is controlled such that the center of the display image 304 and the center of the designated area 306 substantially coincide with each other. Also for the tilt drive, the image capturing parameter is controlled similarly to the pan change described above. When S207 ends, the process returns to S201 again. Note that if an end condition (e.g., in a case where drive for a predetermined time has ended, or a user operation indicating the end has been performed, or the like) is satisfied at the end time point of S207, the process does not return to S201 and ends. In this manner, by controlling the image capturing parameter including the rotation drive and the pan, tilt, and zoom drive of the image capturing sensor and controlling the rotation of the captured image in accordance with the designated area defined in accordance with the two points in response to the input of the user, it is possible to adjust the angle of view including the vertical capture change more simply than before.

The operation terminal 110 may be configured to notify the user before processing of any one or more of S205 to S207 and to select whether or not the change is possible. For example, a pop-up display may be performed on the screen 305 to allow the user to select whether or not the change is possible. In addition to this, the user may be able to select in advance as to whether or not the change is possible by performing in advance an operation using a mouse or the like. By doing this, the user can implement a change matching his/her intention. Such processing may be controlled by the operation terminal 110 or may be controlled by an instruction of the information processing apparatus 100.

Figure 4:
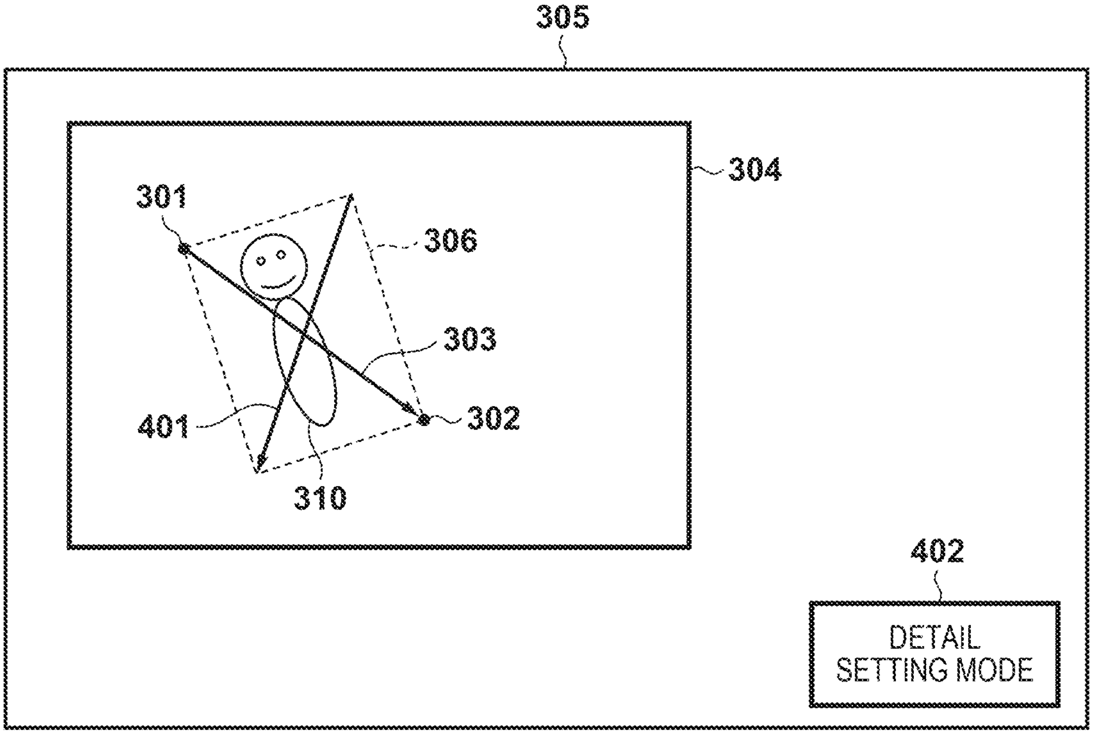
FIG. 4 is a view for explaining setting of an inclined designated area.

In the present embodiment, the description has been given on the assumption that the above-described designated area 306 is a rectangular area whose vertical side is parallel to the vertical side of the display image 304. However, the rectangular area used to determine the image capturing range here is not particularly limited in this manner, and may be inclined in a range of 0° to 90° from the state illustrated in FIGS. 3A to 3E. FIG. 4 is a view for explaining an example of such the designated area 306 that is inclined.

FIG. 4 illustrates an example of a GUI in a detail setting mode for setting the designated area 306 in more detail in the operation terminal 110. For example, the image processing unit 102 may obtain information indicating two straight lines as definition information and set, as a designated area, a rectangular area having these straight lines as diagonals. In the example of FIG. 4, the subject 310 that is a person is captured in a slightly deviating and inclined manner from an upright position. Therefore, in addition to the first straight line 303 input by the user, a second straight line 401 is used as the definition information, and the designated area 306 is set. In the present embodiment, in response to pressing of a button 402 illustrated in FIG. 4, for example, the mode may be transitioned to the detail setting mode in which a plurality of straight lines are input as definition information. According to such processing, for example, even in a case where the image capturing sensor is inclined and the long side of the captured image is not parallel to the ground, the image capturing orientation can be controlled so as to have an angle in accordance with a user instruction.

Figure 5:
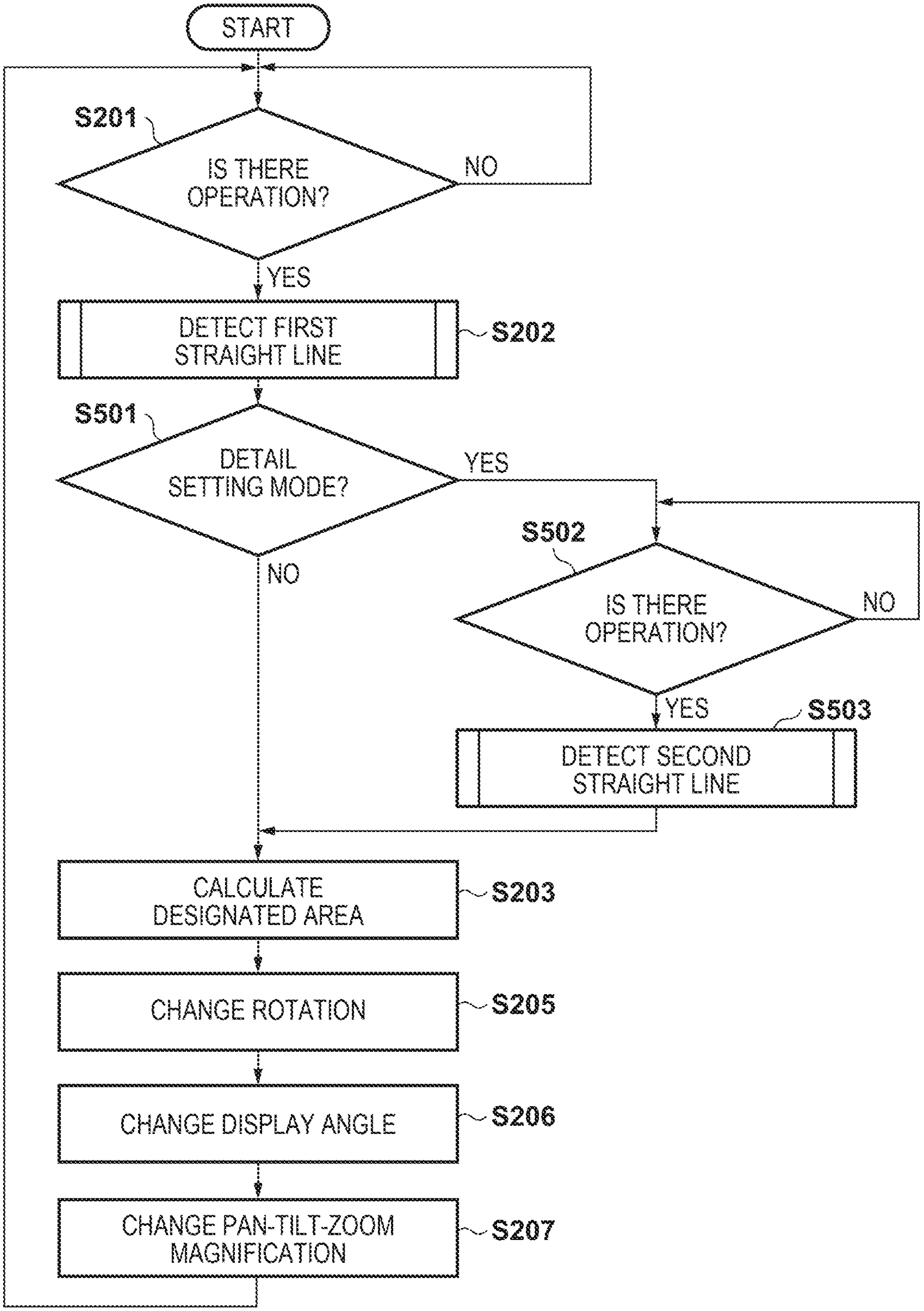
FIG. 5 is a flowchart showing an example of processing of controlling an image capturing parameter and rotation.

Hereinafter, a method of defining the designated area 306 by designating the first straight line 303 and the second straight line 401 will be described in detail with reference to FIG. 5. FIG. 5 is a flowchart showing an example of the control processing by the information processing apparatus 100 according to the present embodiment that performed in a case of using two straight lines as definition information. The processing shown in FIG. 5 is performed similarly to the processing illustrated in FIG. 2 except that S501 to S503 are performed between S202 and S203, and therefore redundant description is omitted.

In S501 subsequent to S202, the information processing apparatus 100 determines whether or not the mode has transitioned to the detail setting mode. Here, it is determined whether or not the detail setting mode is designated by the user. If the mode has transitioned to the detail setting mode, the process proceeds to S502, and otherwise, the process proceeds to S203.

In S502, the image processing unit 102 determines whether or not an additional operation has been performed by the user using the operation terminal 110. Here, the image processing unit 102 determines whether or not definition information different from the first straight line has been input. If the additional operation has not been performed, the process repeats S502, and if the additional operation has been performed, the process proceeds to S503.

In S503, the image processing unit 102 obtains information indicating two points on display different from that obtained in S202. Here, the image processing unit 102 obtains, as information indicating two points, both ends of the straight line additionally input by the user in the detail setting mode.

In S203, the image processing unit 102 calculates the designated area 306, which is a rectangular area, based on the points on display (here, the first straight line 303 and second straight line 401 having been detected). Here, the rectangular area having the first straight line 303 and the second straight line 401 as diagonals is set as the designated area 306.

By setting a plurality of straight lines as definition information and controlling the image capturing parameter based on the rectangular area set based on such the plurality of straight lines, it is possible to easily perform fine adjustment of the rotation angle of the image capturing unit 101 and adjustment of the angle of view.

In the example of FIG. 4, the description has been given assuming that information indicating two points defining the second straight line in addition to two points defining the first straight line is input. However, if an input designating another vertex of the rectangular area having the first straight line as a diagonal in addition to the two points defining the first straight line can be obtained, an input different from the two points defining the second straight line may be obtained. For example, the image processing unit 102 may obtain another point in addition to two points defining the first straight line, and calculate, as the designated area 306, the rectangular area having two points at both ends of the first straight line as diagonal vertices and having the obtained other point as another vertex. Thus, the image processing unit 102 according to the present embodiment can set the designated area based on the information indicating a point including at least one point in addition to two points on display.

Note that in the present embodiment, the description has been performed on the assumption of obtaining a straight line as definition information and setting an image capturing range (control of the image capturing parameter) in accordance with the obtained straight line, but the definition information to be obtained is not limited to a straight line as long as information indicating two points can be obtained. For example, in a case where an ellipse is input by the user using a mouse or the like, a rectangular area circumscribing such an ellipse may be set as a designated area. The image processing unit 102 may set, as a designated area, a minimum rectangular area including a rectangular area circumscribing such an ellipse and having an aspect ratio coincident with the captured image (e.g., having the vertex of the upper left end in common). Here, it is assumed that information indicating two points is generated with a vertex of a rectangular area closest to the first input point at the time of inputting an ellipse as a start point and a vertex of a diagonal position of the vertex as an end point. According to such a configuration, the user can designate the image capturing range by a more intuitive operation.

For example, in a case where the designated area 306 is set (e.g., by S203), a preview thereof may be displayed on the operation terminal 110 so that the designated area 306 can be edited by the user. Such an example will be described below with reference to FIG. 6.

Figure 6:
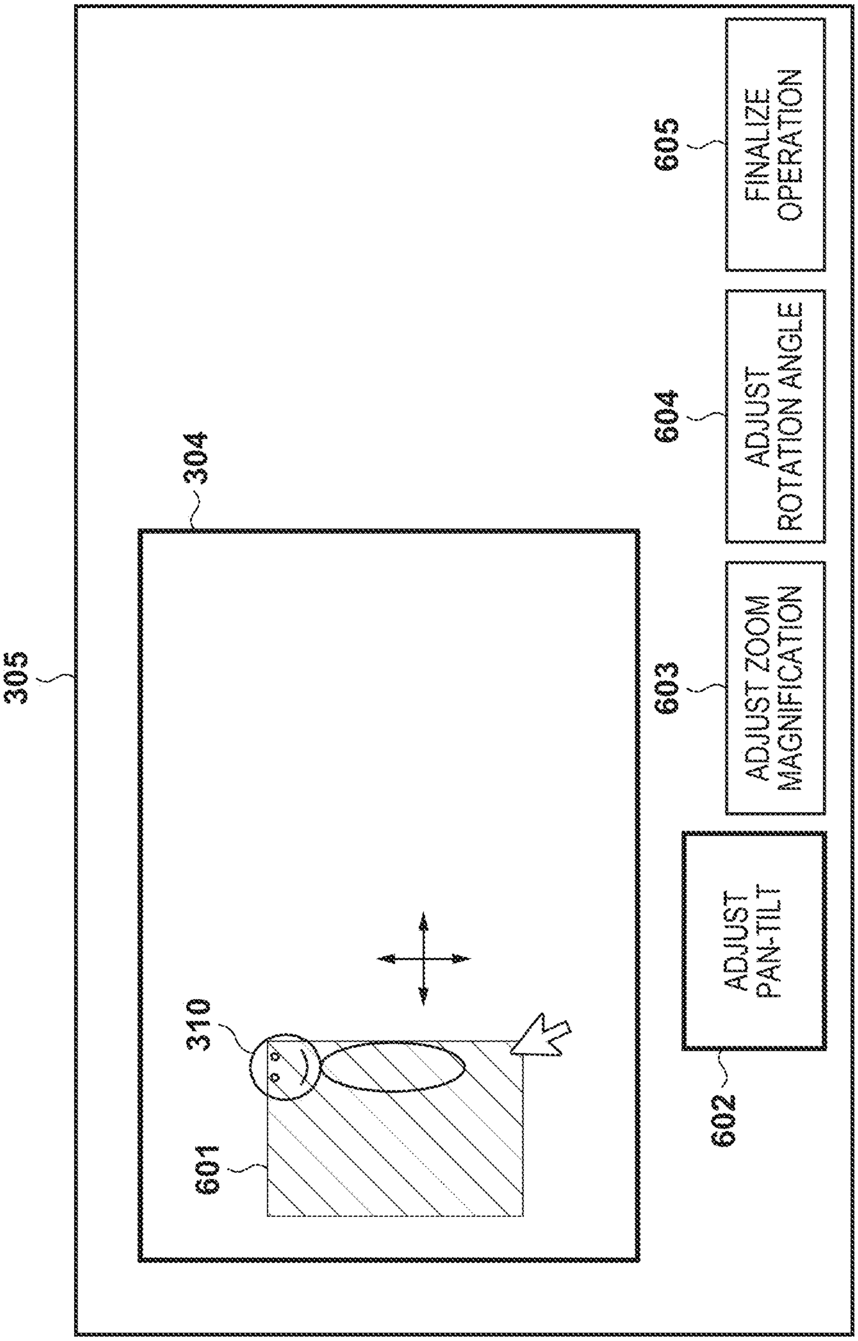
FIG. 6 is a view for explaining detailed setting of a designated area.

In FIG. 6, the screen 305 displays, in addition to the display image 304, buttons 602 to 605 used for setting an image capturing parameter. A variable area 601 is displayed in a superimposed manner on the display image 304. The variable area 601 is a rectangular area that can be edited by the user and represents a preview of the designated area. For example, in response to a user input, the position of the variable area 601 is changed to change a pan-tilt drive amount of the image capturing unit 101, the size of the variable area 601 is changed to change the zoom magnification of the image capturing unit 101, and the rotation drive amount of the image capturing unit 101 is changed by rotating the variable area 601. Note that in a case of changing the size of the variable area 601, the change may be performed while maintaining a state where the aspect ratio of the variable area 601 is equal to that of the display image 304, or the change may be separately performed in the vertical direction and the horizontal direction.

The button 602 is a button for transitioning to a mode for changing the pan-tilt drive amount of the image capturing unit 101. The button 603 is a button for transitioning to a mode for changing the zoom magnification of the image capturing unit 101. The button 604 is a button for transitioning to a mode for changing the rotation drive amount of the image capturing unit 101. The button 605 is a button for ending edition of the variable area 601, and the variable area 601 at the time when the button 605 is pressed is set as the designated area 306. Thus, by causing the designated area 306 to be displayed as the variable area 601 of a preview and obtaining the editing content for the variable area 601, the information processing apparatus 100 can correct the designated area based on the editing content. According to an operation using such the variable area 601, the user can adjust the image capturing range without defining the straight line again.

Figure 7:
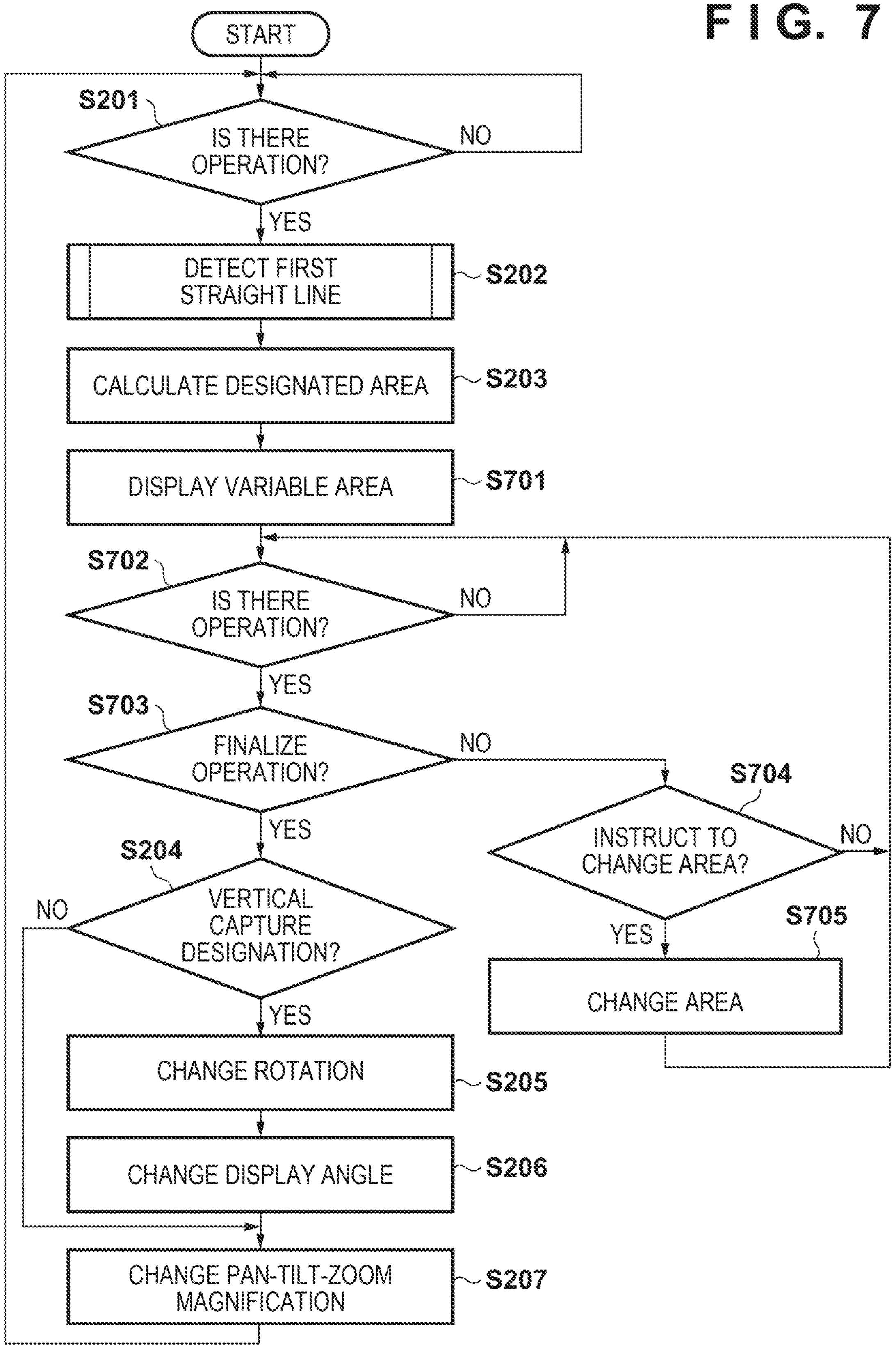
FIG. 7 is a flowchart showing an example of processing of controlling an image capturing parameter and rotation.

Hereinafter, a method of performing edition processing after setting of the designated area 306 will be described in detail with reference to FIG. 7. FIG. 7 is a flowchart showing an example of the control processing by the information processing apparatus 100 according to the present embodiment that performs edition processing of such a designated area. The processing shown in FIG. 7 is performed similarly to the processing illustrated in FIG. 2 except that S701 to S705 are performed between S203 and S204, and therefore redundant description is omitted.

In S701 subsequent to S203, the information processing apparatus 100 displays the variable area 601 in a superimposed manner on the display image 304 in the operation terminal 110. Here, it is assumed that the initial position and size of the variable area 601 are the same as those of the designated area 306.

In S702, the information processing apparatus 100 determines whether or not an editing operation has been performed for the variable area 601. If the editing operation has not been performed, the process repeats S702, and if the editing operation has been performed, the process proceeds to S703. In S703, the information processing apparatus 100 determines whether or not the editing operation having been performed is to instruct an end of the operation. If the editing operation is to instruct the end of the operation, the processing proceeds to S204, and otherwise, the processing proceeds to S704.

In S704, the information processing apparatus 100 determines whether or not an operation of changing the variable area 601 has been performed. If the operation of changing the variable area 601 has not been performed, the processing returns to S702, otherwise, the processing proceeds to S705.

In S705, the information processing apparatus 100 performs change of the position and size or rotation of the variable area 601 in response to the change operation, and returns the process to S702.

According to such a configuration, the user can perform fine adjustment of the designated area, and can perform change in accordance with the angle of view matching the user's preference more.

In the present embodiment, the description has been given assuming that the designated area is a rectangular area having the same aspect ratio as that of the captured image. However, it is conceivable a case where a rectangular area having a line segment between two points of definition information as a diagonal and having each side parallel to that of the captured image is an area having an aspect ratio different from that of the captured image. In such a case, an example in which the image processing unit 102 sets a corrected area in which the designated area set from two points indicated by the definition information is corrected will be described with reference to FIG. 8.

Figure 8:
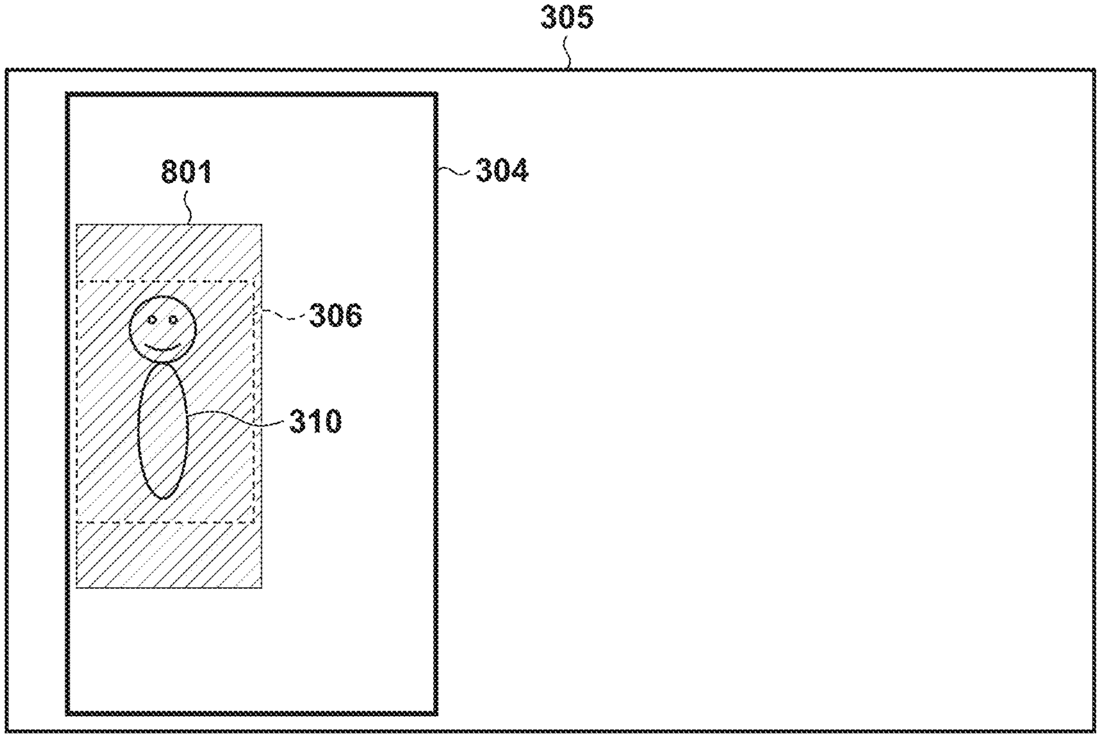
FIG. 8 is a view for explaining correction of a designated area.

FIG. 8 illustrates an example of a case where the designated area 306 is an area different from the aspect ratio of the captured image by the image capturing unit 101. In a case where the aspect ratios of the designated area 306 and the display image 304 are not coincident with each other after calculation of the designated area 306, the information processing apparatus 100 corrects the designated area 306 to generate a corrected area 801 as illustrated in FIG. 8. The corrected area 801 is an area including the entire designated area 306 and having an aspect ratio coincident with that of the display image 304. For example, the image processing unit 102 may generate the corrected area 801 having the aspect ratio coincident with that of the display image 304 by maintaining the length of one of the vertical side and the horizontal side and changing the length of the other (in particular, selecting an area having a smaller area from these areas) while maintaining the position of the center point in the designated area 306. In the example of FIG. 8, the corrected area 801 is generated from the designated area 306 by maintaining the length of the horizontal side and extending the length of the vertical side.

According to such processing, it is possible to display a captured image matching the aspect ratio of the image capturing sensor without limiting the position and range of the straight line defined by the user.

In the present embodiment, the description has been given assuming that the image capturing parameter is controlled so as to capture the designated area 306, but for example, the designated area 306 may be cut out and displayed. According to such processing, it is possible to display the image capturing range intended by the user after obtaining the captured image by the image capturing sensor.

Second Embodiment

In the above-described embodiment, for example, each processing unit illustrated in FIG. 1 and the like is implemented by dedicated hardware. However, some or all of the processing units included in the information processing apparatus 100 may be implemented by a computer. In the present embodiment, at least part of the processing according to each of the above-described embodiments is executed by a computer.

Figure 9:
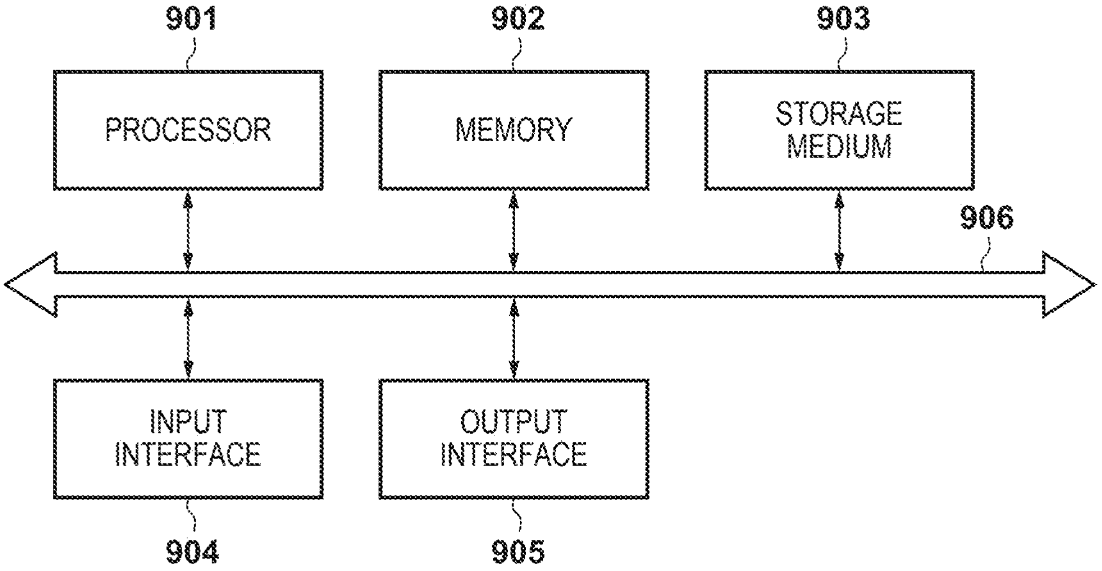
FIG. 9 is a block diagram illustrating an example of a hardware configuration of an information processing apparatus.

FIG. 9 is a view illustrating a basic configuration of a computer. In FIG. 9, a processor 901 is, for example, a CPU, and controls the operation of the entire computer. A memory 902 is, for example, a RAM, and temporarily stores programs, data, and the like. A storage medium 903 that is computer-readable is, for example, a hard disk, a CD-ROM, or the like, and stores programs, data, and the like for a long period of time. In the present embodiment, the program that implements the function of each unit stored in the storage medium 903 is read into the memory 902. Then, the processor 901 operates in accordance with the program on the memory 902, thereby implementing the function of each unit.

In FIG. 9, an input interface 904 is an interface for obtaining information from an external apparatus. An output interface 905 is an interface for outputting information to an external apparatus. A bus 906 connects the units described above and enables data exchange.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-216195, filed Dec. 21, 2023, which is hereby incorporated by reference herein in its entirety.

What is claimed is:

1. An information processing apparatus comprising:

one or more memories configured to store instructions; and one or more processors configured to execute the instructions to:

obtain information designating an image capturing range on a captured image captured by an image capturing device rotatable about an optical axis;

determine whether or not to rotate the image capturing device about the optical axis based on the obtained information; and control the image capturing device based on a determination result, wherein the information is information of a line segment between two points designated by a user on the captured image, the information includes information indicating a start point and an end point of the line segment, the one or more processors determine whether or not to rotate the image capturing device based on a positional relationship between the start point and the end point, in a case where a coordinate system in which a horizontal direction is an x axis and a vertical direction is a y axis is defined on the captured image, the one or more processors determine whether or not to rotate the image capturing device based on a relationship in a y coordinate in the coordinate system of the captured image between the start point and the end point, and the one or more processors, when a downward vertical direction is a positive direction of the y coordinate on the captured image, perform control so as to rotate the image capturing device by 180° in a case where the y coordinate of the start point is equal to or greater than the y coordinate of the end point.

2. The information processing apparatus according to claim 1, wherein the one or more processors control the image capturing device so as to capture a rectangular area having the line segment as a diagonal.

3. The information processing apparatus according to claim 1, wherein the one or more processors is further configured to execute the instructions to generate a corrected area in which a rectangular area having a line segment between the two points as a diagonal is corrected, and the one or more processors control the image capturing device so as to capture the corrected area.

4. The information processing apparatus according to claim 3, wherein the corrected area is an area in which the rectangular area is corrected so as to have an aspect ratio equal to an aspect ratio of the captured image.

5. The information processing apparatus according to claim 3, wherein the one or more processors is further configured to obtain editing content for the rectangular area, and the one or more processors correct the rectangular area based on the editing content.

6. The information processing apparatus according to claim 1, wherein the image capturing device can perform pan rotation or tilt rotation and can change a zoom magnification.

7. An information processing apparatus comprising:

one or more memories configured to store instructions; and one or more processors configured to execute the instructions to:

obtain information designating an image capturing range on a captured image captured by an image capturing device rotatable about an optical axis;

determine whether or not to rotate the image capturing device about the optical axis based on the obtained information; and control the image capturing device based on a determination result, wherein the information is information of a line segment between two points designated by a user on the captured image, the one or more processors further obtain information indicating at least one point in addition to the two points, and the one or more processors control the image capturing device so as to capture a rectangular area having the two points as diagonal vertices and having the at least one point as a vertex different from the two points.

8. An information processing apparatus comprising:

one or more memories configured to store instructions; and one or more processors configured to execute the instructions to:

obtain information designating an image capturing range on a captured image captured by an image capturing device rotatable about an optical axis;

determine whether or not to rotate the image capturing device about the optical axis based on the obtained information;

control the image capturing device based on a determination result;

notify a user before rotation control of the image capturing device; and obtain an input as to whether or not to execute rotation control of the image capturing device, wherein the one or more processors execute rotation control of the image capturing device in a case where an input of executing rotation control of the image capturing device is obtained.

9. An information processing method comprising:

obtaining information designating an image capturing range on a captured image captured by an image capturing device rotatable about an optical axis;

determining whether or not to rotate the image capturing device about the optical axis based on the obtained information;

controlling the image capturing device based on a determination result; and obtaining information indicating at least one point in addition to the two points, wherein the information is information of a line segment between two points designated by a user on the captured image, the image capturing device is controlled so as to capture a rectangular area having the two points as diagonal vertices and having the at least one point as a vertex different from the two points.

10. A non-transitory computer-readable storage medium storing program which, when executed by a computer comprising a processor and memory, causes the computer to:

obtain information designating an image capturing range on a captured image captured by an image capturing device rotatable about an optical axis;

determine whether or not to rotate the image capturing device about the optical axis based on the obtained information; and control the image capturing device based on a determination result; and obtain information indicating at least one point in addition to the two points, wherein the information is information of a line segment between two points designated by a user on the captured image, the image capturing device is controlled so as to capture a rectangular area having the two points as diagonal vertices and having the at least one point as a vertex different from the two points.

* * * * *